United States Patent
Liu

(10) Patent No.: US 10,963,194 B2
(45) Date of Patent: Mar. 30, 2021

(54) INFORMATION PROCESSING APPARATUS AND NON-TRANSITORY COMPUTER READABLE MEDIUM FOR RESTRICTING SIMULTANEOUS ACCESS TO A PRINT JOB

(71) Applicant: FUJI XEROX CO., LTD., Tokyo (JP)

(72) Inventor: Bo Liu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 118 days.

(21) Appl. No.: 15/985,803

(22) Filed: May 22, 2018

(65) Prior Publication Data

US 2018/0349069 A1 Dec. 6, 2018

(30) Foreign Application Priority Data

Jun. 5, 2017 (JP) ............................. JP2017-110943

(51) Int. Cl.
*G06F 3/12* (2006.01)

(52) U.S. Cl.
CPC .......... *G06F 3/1205* (2013.01); *G06F 3/1256* (2013.01); *G06F 3/1258* (2013.01); *G06F 3/1286* (2013.01); *G06F 3/1287* (2013.01); *G06F 3/1288* (2013.01); *G06F 3/1292* (2013.01); *G06F 3/1238* (2013.01)

(58) Field of Classification Search
CPC .... G06F 3/1205; G06F 3/1256; G06F 3/1258; G06F 3/1286; G06F 3/1287; G06F 3/1288; G06F 3/1292; G06F 3/1238

USPC ................................. 358/1.1–1.18, 402, 474
See application file for complete search history.

(56) References Cited

U.S. PATENT DOCUMENTS

| | | | | |
|---|---|---|---|---|
| 2010/0030707 | A1* | 2/2010 | Jingu | G06F 3/1253 705/400 |
| 2010/0251092 | A1* | 9/2010 | Sun | G06F 40/174 715/222 |
| 2014/0085653 | A1* | 3/2014 | Imagawa | G06F 3/1204 358/1.13 |
| 2015/0334398 | A1* | 11/2015 | Socek | G06T 7/174 375/240.26 |
| 2016/0202938 | A1* | 7/2016 | Bandyopadhyay ... | G06F 3/1205 358/1.15 |
| 2018/0165045 | A1* | 6/2018 | Hagiwara | G06F 3/1238 |

FOREIGN PATENT DOCUMENTS

| | | |
|---|---|---|
| JP | 2004-102614 A | 4/2004 |
| JP | 2007-237473 A | 9/2007 |

* cited by examiner

*Primary Examiner* — Gabriel I Garcia
(74) *Attorney, Agent, or Firm* — Oliff PLC

(57) ABSTRACT

An information processing apparatus includes a receiver, a sender, and a limiter. The receiver receives a viewing request to view an attribute of a print job from an operator. The print job is a job which allows plural operators to make a request to view an attribute. The sender sends the attribute of the print job in accordance with the viewing request. The limiter imposes limitations, when a changing request to change an attribute of the print job is received from the operator, so that operators other than the operator having made the changing request will be unable at least to change the attribute of the print job and to generate an image concerning the print job.

7 Claims, 12 Drawing Sheets

INFORMATION PROCESSING APPARATUS AND NON-TRANSITORY COMPUTER READABLE MEDIUM FOR RESTRICTING SIMULTANEOUS ACCESS TO A PRINT JOB

CROSS-REFERENCE TO RELATED APPLICATIONS

This application is based on and claims priority under 35 USC 119 from Japanese Patent Application No. 2017-110943 filed Jun. 5, 2017.

BACKGROUND

Technical Field

The present invention relates to an information processing apparatus and a non-transitory computer readable medium.

SUMMARY

According to an aspect of the invention, there is provided an information processing apparatus including a receiver, a sender, and a limiter. The receiver receives a viewing request to view an attribute of a print job from an operator. The print job is a job which allows plural operators to make a request to view an attribute. The sender sends the attribute of the print job in accordance with the viewing request. The limiter imposes limitations, when a changing request to change an attribute of the print job is received from the operator, so that operators other than the operator having made the changing request will be unable at least to change the attribute of the print job and to generate an image concerning the print job.

BRIEF DESCRIPTION OF THE DRAWINGS

An exemplary embodiment of the present invention will be described in detail based on the following figures, wherein.

DETAILED DESCRIPTION

Before describing the exemplary embodiment, an image processing device which forms a base of this exemplary embodiment or utilizes this exemplary embodiment will first be discussed. This description will be given for easy understanding of this exemplary embodiment.

A printer first receives a print job, which is a print instruction, and then performs printing. Commercial image processing devices (including image forming devices), such as production printers, in particular, first receive plural print jobs and then perform printing. It thus usually takes time before printing is started after a print job is received. Additionally, after a print job is received, it may become necessary to change an attribute of this print job. To do this, it is necessary to view (or refer to) the attribute of the print job. In this case, plural operators may change the attributes of the same print job at the same time. Mutual exclusion control is thus performed so that the attributes of the same print job will not be changed by plural operators at the same time.

Usually, when an operator user views the attributes of a print job, authorization for other users is restricted as follows:

(1) unable to change the attributes of this print job; and
(2) unable to generate a document image concerning this print job.

Figure 11:
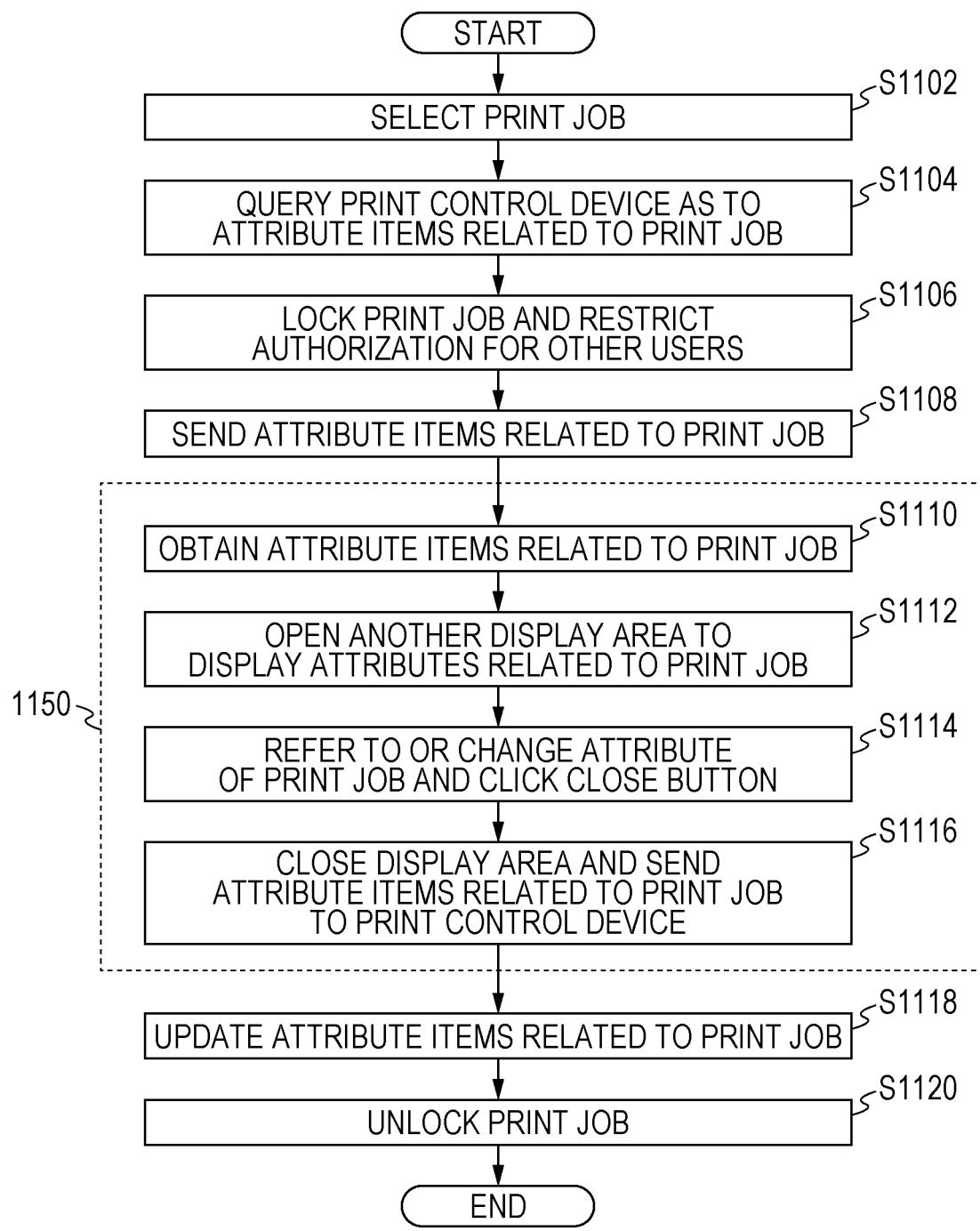
FIG. 11 is a flowchart illustrating an example of processing executed by an information processing apparatus which does not utilize the exemplary embodiment.

For example, the following processing shown in FIG. 11 is executed to change an attribute of a print job. FIG. 11 is a flowchart illustrating an example of processing executed by an information processing apparatus which does not utilize this exemplary embodiment.

In step S1102, a user selects a print job.

In step S1104, a user terminal queries a print control device as to attribute items related to the print job. That is, the user terminal makes a request to view the attributes of the print job.

In step S1106, the print control device locks the print job and restricts authorization concerning this print job for other users. That is, the print control device performs mutual exclusion control so that users other than the user first made a request to view the attributes of the print job will be unable to change the attributes.

In step S1108, the print control device sends attribute items related to the print job to the user terminal.

In step S1110, the user terminal receives the attribute items related to the print job.

In step S1112, the user terminal opens another display area (also called a window) to display the attributes related to the print job.

In step S1114, the user refers to or changes an attribute of the print job and then clicks a close button to close the display area. Clicking the close button corresponds to making a request to change the attribute to the current attribute indicated within the display area.

In step S1116, the user terminal closes this display area and sends the attribute items related to the print job to the print control device.

In step S1118, the print control device updates the attribute items related to the print job.

In step S1120, the print control device unlocks the print job.

Steps S1102 and S1114 are operations executed by the user.

Steps S1104, S1110, S1112, and S1116 are operations executed by the user terminal used by the user (operations principally related to a user interface).

Steps S1106, S1108, S1118, and S1120 are operations executed by the print control device.

A processing period 1150 (steps S1110 through S1116) is a period from when the user terminal obtains the attribute items related to the print job until when the user terminal sends a request to update the attributes. The processing period 1150 is a long period because some users may have to search for an attribute to be edited, for example. The processing period 1150 is included in a period for which mutual exclusion control is performed (steps S1106 through S1120). The mutual exclusion control period is thus equal to or longer than the processing period 1150.

In the processing represented by the flowchart of FIG. 11, even if the user only refers to the attributes of the print job, the print control device locks all the attributes of the print job.

A period of time for which a user views the attributes of a print job may differ depending on the user and the situation. The user may view the attributes for a very long time. If the print job is a shared print job, another user may wish to change an attribute of this print job or generate an image concerning this print job. The shared print job is a print job which allows plural operators to make a request concerning this print job. The shared print job is accessible without a password. According to the processing shown in FIG. 11, however, while a certain user is viewing the attributes of a print job, another user is unable to change an attribute of this print job or generate an image concerning this print job.

The exemplary embodiment of the invention will be described below with reference to the accompanying drawings.

Figure 1:
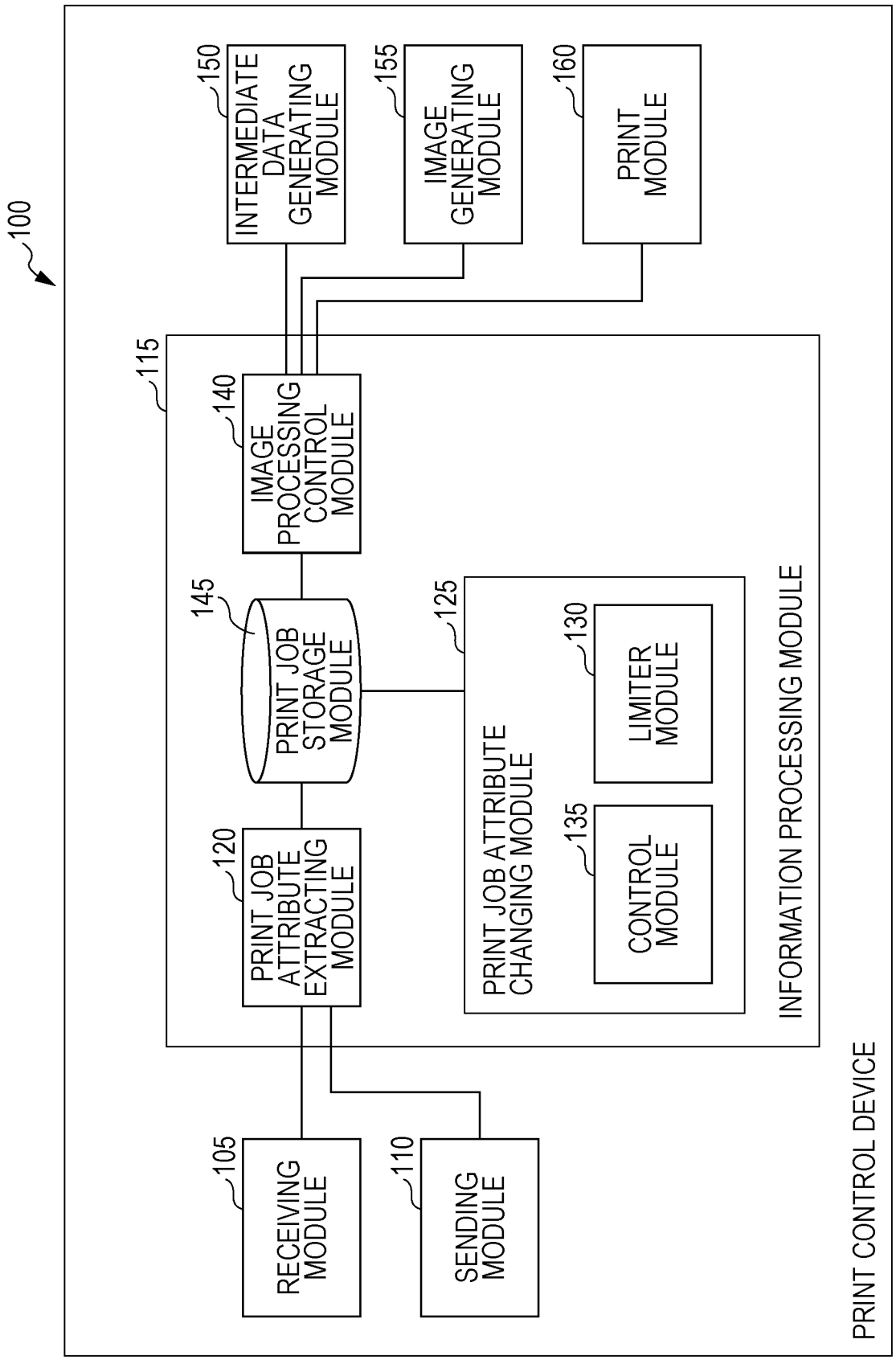
FIG. 1 is a block diagram of conceptual modules forming an example of the configuration of the exemplary embodiment.

FIG. 1 is a block diagram of conceptual modules forming an example of the configuration of the exemplary embodiment.

Generally, modules are software (computer programs) components or hardware components that can be logically separated from one another. The modules of the exemplary embodiment of the invention are, not only modules of a computer program, but also modules of a hardware configuration. Thus, the exemplary embodiment will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus may be implemented by connecting plural computers, hardware units, devices, etc., to one another via a communication medium, such as a network (including communication based on a one-to-one correspondence), or may be implemented by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk (HD), a random access memory (RAM), an external storage medium, a storage device using a communication line (including a network), a register within a central processing unit (CPU), etc.

A print control device 100 shown in FIG. 1 allows a user to view attributes of a print job and updates an attribute changed by a user. As shown in FIG. 1, the print control device 100 includes a receiving module 105, a sending module 110, an information processing module 115, an intermediate data generating module 150, an image generating module 155, and a print module 160.

The receiving module 105 is connected to a print job attribute extracting module 120 of the information processing module 115. The receiving module 105 receives a request to view attributes of a print job from an operator, and supplies the request to the print job attribute extracting module 120. In this case, the print job is a job which can be viewed by plural operators. The receiving module 105 may also receive a request to change the value of an attribute, a request to generate an image, and a request to start printing. The receiving module 105 supplies these requests to the information processing module 115, and the information processing module 115 executes processing in accordance with these requests.

The sending module 110 is connected to the print job attribute extracting module 120 of the information processing module 115. The sending module 110 sends the attributes of a print job in response to a request to view the attributes received by the receiving module 105. The sending destination is a user sent this request (a user terminal operated by this operator). The attributes of the print job sent by the sending module 110 are those extracted by the print job attribute extracting module 120.

The information processing module 115 includes the print job attribute extracting module 120, a print job attribute changing module 125, an image processing control module 140, and a print job storage module 145. The information processing module 115 principally executes processing concerning the attributes of print jobs.

The print job attribute extracting module 120 is connected to the receiving module 105, the sending module 110, and the print job storage module 145. The print job attribute extracting module 120 extracts the attributes of a print job from the print job storage module 145 in response to a request to view the attributes received by the receiving module 105, and supplies the extracted attributes to the sending module 110.

Figure 4:
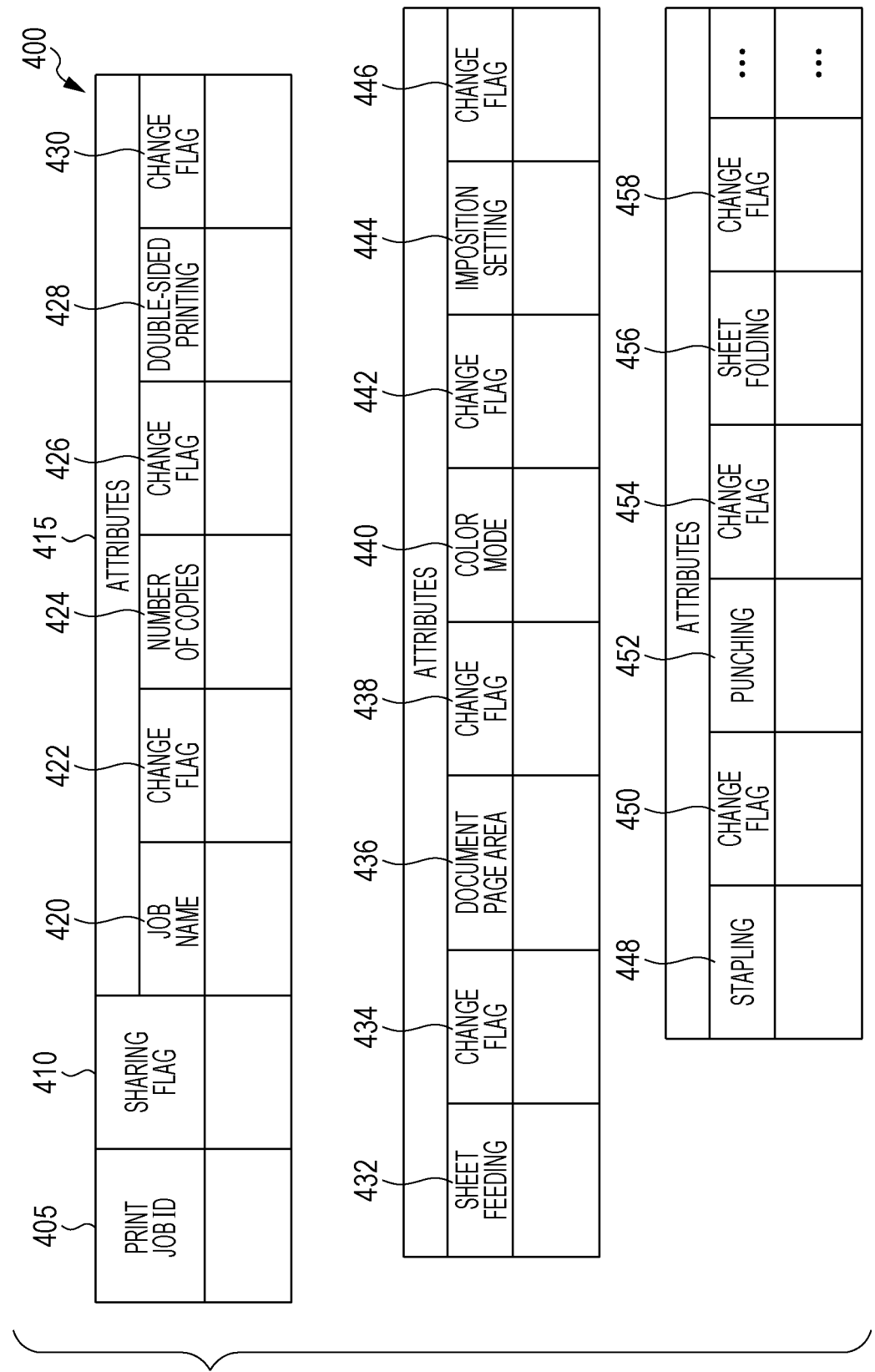
FIG. 4 illustrates an example of the data structure of a print job attribute table.

The print job storage module 145 is connected to the print job attribute extracting module 120, the print job attribute changing module 125, and the image processing control module 140. The print job storage module 145 stores the attributes of print jobs, for example. The print job storage module 145 stores a print job attribute table 400, for example. FIG. 4 illustrates an example of the data structure of the print job attribute table 400. The print job attribute table 400 has a print job ID field 405, a sharing flag field 410, and an attribute field 415. The attribute field 415 has a job name field 420, a change flag field 422, a number-of-copies field 424, a change flag field 426, a double-sided printing field 428, a change flag field 430, a sheet feeding field 432, a change flag field 434, a document page area field 436, a change flag field 438, a color mode field 440, a change flag field 442, an imposition setting field 444, a change flag field 446, a stapling field 448, a change flag field 450, a punching field 452, a change flag field 454, a sheet folding field 456, and a change flag field 458. The print job ID field 405 stores information (print job identification (ID)) for uniquely identifying a print job in this exemplary embodiment. The sharing flag field 410 stores a sharing flag. The sharing flag is information indicating whether this print job is a shared print job. The attribute field 415 stores attributes of this print job. The job name field 420 stores the name of this print job. The change flag field 422 stores a change flag for this job name. The change flag is information indicating whether a corresponding attribute has been changed ("1" or "0", for example), and indicates that, if the attribute has already been changed, another operator is unable to change it. Alternatively, the change flag may be information indicating whether this attribute is changeable. That is, if the attribute is not changeable, the change flag indicates that the attribute has already been changed (nobody can change the attribute). The number-of-copies field 424 stores the number of copies to be printed in the print job. The change flag 426 stores a change flag for the number of copies. The double-sided printing field 428 stores information indicating whether double-sided printing is performed. The change flag 430 stores a change flag for the information concerning double-sided printing. The sheet feeding field 432 stores information indicating how to feed a sheet in this print job. The change flag 434 stores a change flag for the information concerning sheet feeding. The document page area field 436 stores the document page area of this print job. The change flag 438 stores a change flag for the document page area. The color mode field 440 stores a color mode of this print job. The change flag field 442 stores a change flag for the color mode. The imposition setting field 444 stores an imposition setting of this print job. The change flag field 446 stores a change flag for the imposition setting. The stapling field 448 stores information indicating whether stapling is performed in this print job. The change flag field 450 stores a change flag for the information concerning stapling. The punching field 452 stores information indicating whether punching is performed in this print job. The change flag field 454 stores a change flag for the information concerning punching. The sheet folding field 456 stores information indicating whether sheet folding is performed in this print job. The change flag 458 stores a change flag for the information concerning sheet folding. The attributes shown in FIG. 4 are only examples, and other attributes are not excluded.

The print job attribute changing module 125 includes a limiter module 130 and a control module 135, and is connected to the print job storage module 145. In response to a request to change the value of an attribute of a print job received by the receiving module 105, the print job attribute changing module 125 changes the value of this attribute. When changing the value of the attribute, the print job attribute changing module 125 performs mutual exclusion control.

When the receiving module 105 has received a request to change an attribute of a print job from an operator, the limiter module 130 imposes limitations so that operators other than the operator having sent the request will be unable at least (1) to change this attribute of the print job and (2) to generate an image concerning this print job. Imposing such limitations is also called mutual exclusion control or locking.

An operator may make "a request to change an attribute" according to the attribute. More specifically, an icon indicating a request to change a certain attribute of a print job is displayed, and when an operator has selected the icon, a request to change this attribute is received. The other operators are unable to make a request to change this attribute and a request to generate an image concerning this print job. On the viewing screens of the other operators, the icon indicating a request to change this attribute is not displayed. Alternatively, the icon may gray out so that the other operators will be unable to select this icon.

When the limiter module 130 detects that the operation for changing the attribute has been completed, it may cancels the limitations.

When the limiter module 130 detects that an area other than the area of the attribute to be changed has been selected, it may assume that the operation for changing the attribute has been completed. Alternatively, when the limiter module 130 detects that an input completion code has been input within the area of the attribute to be changed by using a keyboard, it may assume that the operation for changing the attribute has been completed. For example, instead of displaying a user interface (a change button, for example) indicating the completion of the editing operation, when the limiter module 130 detects that an area other than the area of the attribute to be changed has been selected or that a key (return key) indicating the end of input of one line has been selected, it may assume that the editing operation has been completed.

The control module 135 performs control so that, when the receiving module 105 has received a request to view the attributes of a print job from an operator, a limitation concerning viewing of the attributes of this print job will not be imposed. That is, if a certain operator merely wishes to view the attributes of this print job, the control module 135 does not perform mutual exclusion control, and plural operators can view the attributes of this print job.

The control module 135 may perform control so that, when the receiving module 105 has received a request to view the attributes of a print job from an operator, the other operators will still be able to change an attribute of this print job and to generate an image concerning this print job. That is, only with a request to view the attributes of a print job (more specifically, if a request to view the attributes of a print job has been received but a request to change an attribute of this print job has not been received), the control module 135 does not perform mutual exclusion control. Then, the other operators can make a request to change an attribute of this print job or a request to generate an image concerning this print job. If a request to change an attribute of this print job is received, the other operators are not allowed to make a request to change an attribute of the print job or a request to generate an image concerning the print job. That is, the operator first made a request to change an attribute of the print job is allowed to change the attribute, and the other operators are not allowed to do so (on a first-come-first-served basis).

The image processing control module 140 is connected to the print job storage module 145, the intermediate data generating module 150, the image generating module 155, and the print module 160. The image processing control module 140 controls the intermediate data generating module 150, the image generating module 155, and the print module 160 in accordance with a request to generate an image received by the receiving module 105, a request to start printing received by the receiving module 105, or a request to perform printing based on a print schedule received by the receiving module 105. For example, if a request to generate an image is received, the image processing control module 140 causes the intermediate data generating module 150 and the image generating module 155 to execute processing. If a request to start printing is received, the image processing control module 140 causes the intermediate data generating module 150, the image generating module 155, and the print module 160 to execute processing.

The intermediate data generating module 150 is connected to the image processing control module 140. The intermediate data generating module 150 generates intermediate mode document data from a document to be printed in a print job. The data structure of the intermediate mode document data is that at a stage prior to that of printing data. It is difficult to generate printing data directly from a document, and thus, intermediate mode document data is temporarily generated. It is easier to generate intermediate mode document data from a document than to generate printing data from a document. It is also easier to generate printing data from intermediate mode document data than to generate printing data from a document.

The image generating module 155 is connected to the image processing control module 140. The image generating module 155 generates printing data (image) that can be printed by the print module 160 from the intermediate mode document data generated by the intermediate data generating module 150.

The print module 160 is connected to the image processing control module 140. The print module 160 controls a printer 250 shown in FIG. 2 so that the printing data generated by the image generating module 155 can be printed.

Figure 2:
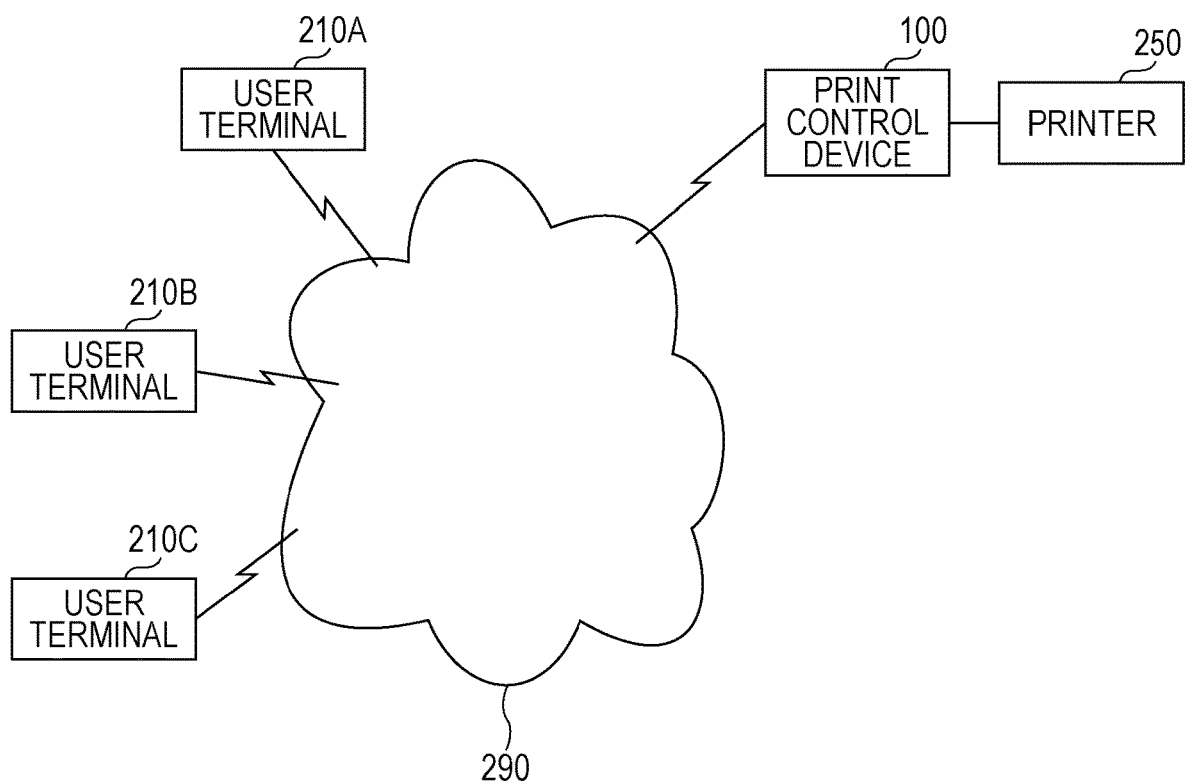
FIG. 2 is a schematic diagram illustrating an example of a system utilizing the exemplary embodiment.

FIG. 2 is a schematic diagram illustrating an example of a system utilizing this exemplary embodiment.

The print control device 100 and user terminals 210A, 210B, and 210C are connected to one another via a communication line 290. Hereinafter, the user terminals 210A, 210B, 210C will simply be called the user terminal 210 or the user terminals 210 unless it is necessary to distinguish them from each other. The communication line 290 may be a wireless or wired medium, or a combination thereof, and may be, for example, the Internet or an intranet as a communication infrastructure. The functions of the print control device 100 may be implemented as cloud services. The print control device 100 is connected to the printer 250. The print control device 100 and the printer 250 may form a commercial image processing device, such as a production printer. The print module 160 controls the printer 250 so as to perform printing.

A print job is sent from each user terminal 210 to the print control device 100. Each user terminal 210 may send a request to view the attributes of a print job, a request to change an attribute of a print job, a request to generate an image concerning a print job, or a request to perform printing to the print control device 100. In this case, plural operators may send requests concerning the same print job. Mutual exclusion control is not performed for a request to view the attributes of the print job, but is performed for a request to change an attribute of the print job so that a request to change an attribute only from one operator can be received.

Figure 3:
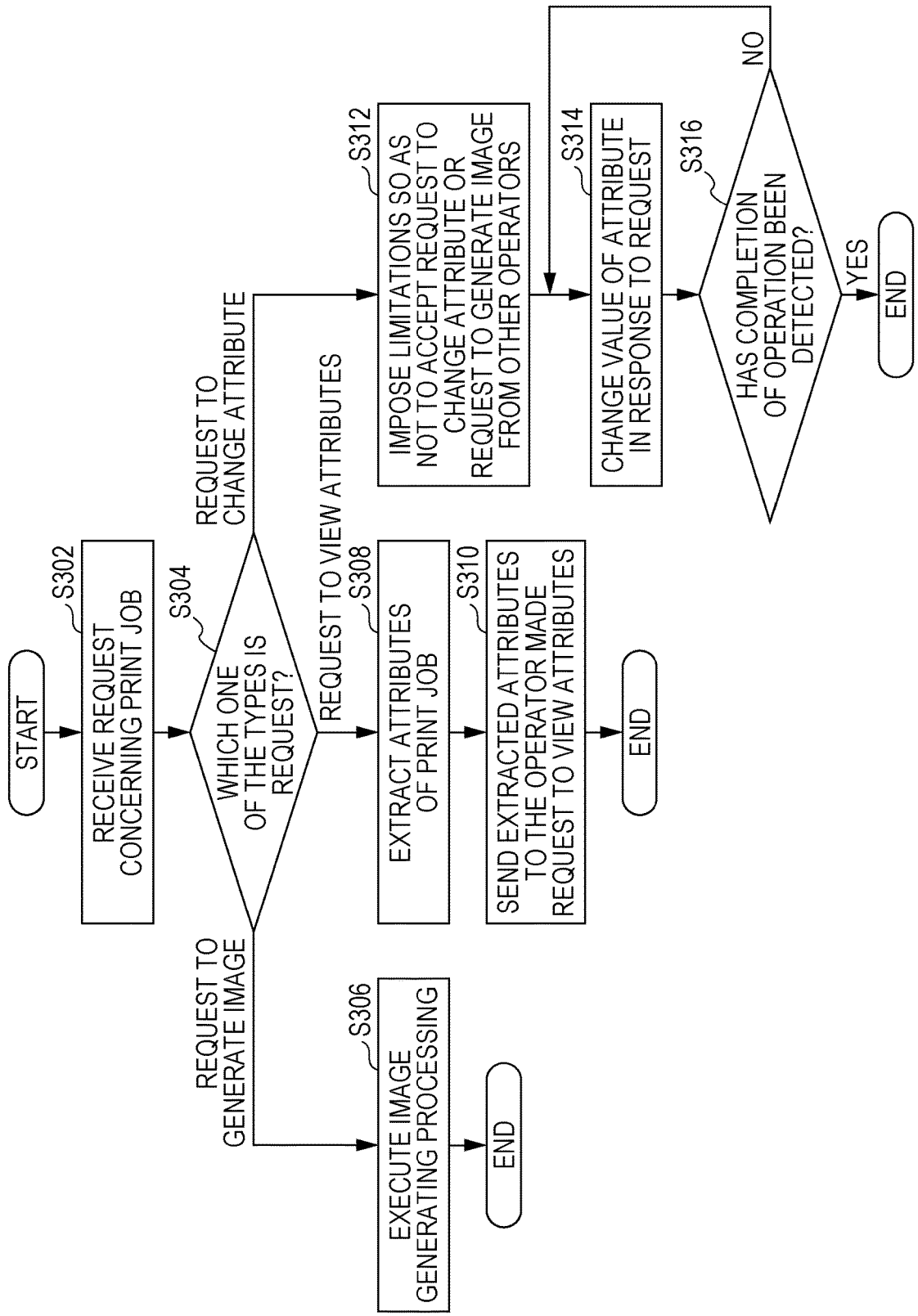
FIG. 3 is a flowchart illustrating an example of processing executed in the exemplary embodiment.

FIG. 3 is a flowchart illustrating an example of processing executed in the exemplary embodiment.

In step S302, the receiving module 105 receives a request concerning a print job from an operator.

In step S304, the receiving module 105 determines the type of request. If the request is a request to generate an image, the process proceeds to step S306. If the request is a request to view attributes, the process proceeds to step S308. If the request is a request to change an attribute, the process proceeds to step S312.

In step S306, the image processing control module 140 controls the intermediate data generating module 150 and the image generating module 155 so as to execute image generating processing.

In step S308, the print job attribute extracting module 120 extracts the attributes of the print job from the print job storage module 145.

In step S310, the sending module 110 sends the extracted attributes to the operator having made the request to view the attributes.

In step S312, the limiter module 130 imposes limitations so that a request to change the attribute or a request to generate an image will not be accepted from operators other than the operator having made the request.

In step S314, the information processing module 115 changes the value of the attribute in response to the request.

In step S316, the limiter module 130 determines whether it has detected the completion of the operation. If the limiter module 130 has detected the completion of the operation, it cancels the limitations imposed in step S312 and completes the processing. If the limiter module 130 has not detected the completion of the operation, the process returns to step S314.

Figure 5:
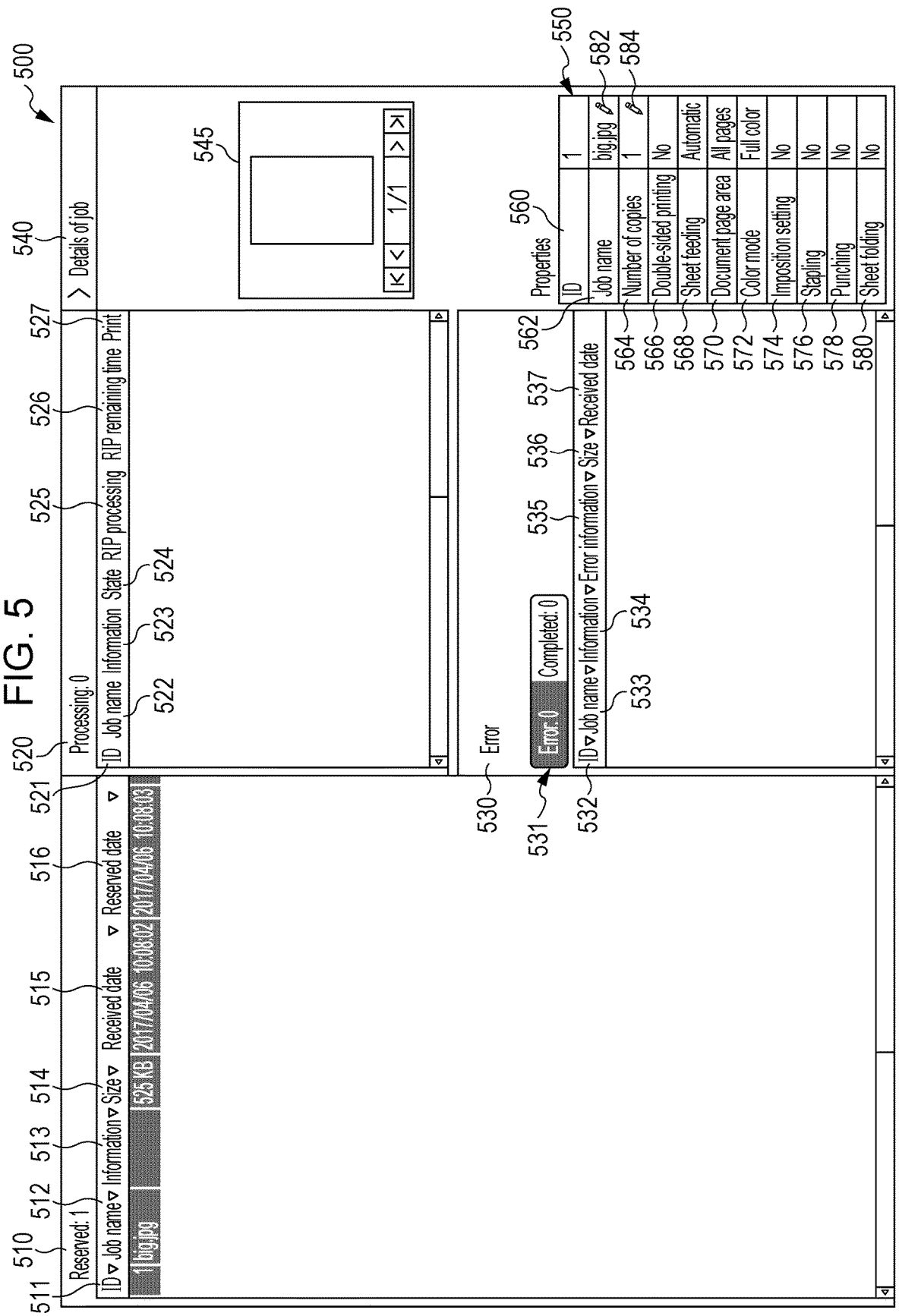
FIG. 5 illustrates a display example in the exemplary embodiment.

FIG. 5 illustrates a display example in the exemplary embodiment.

By using a browser, the user terminal 210 displays data received from the print control device 100 as a print status screen 500 on a display, such as a liquid crystal display, of the user terminal 210.

The print status screen 500 includes a job processing field where a print job can be selected and an item display field where attribute items of a print job are displayed. The job processing field includes a reserved print job display area 510, a processing print job display area 520, and a completed print job display area 530. The item display field includes a print job attribute display area 540. The attributes of a print job selected in the job processing field are displayed in the item display field, and the content of the attributes can be changed in the item display field.

There are two modes, that is, a reference mode and a changing mode, which may be set for each attribute of a print job displayed in the item display field. If a user merely views the attributes of a print job in the reference mode, the print job is not locked. If a user wishes to change an attribute of the print job, the changing mode is set only for this attribute (item), that is, this attribute is locked so that other users are unable to change this attribute.

In the reserved print job display area 510, a print job which has been received by the print control device 100 and which has not yet started processing is displayed. In the processing print job display area 520, a print job which has started processing (by at least one of the intermediate data generating module 150, the image generating module 155, and the print module 160) and which has not been completed yet is displayed. When the operator transfers a print job within the reserved print job display area 510 to the processing print job display area 520 or when a print job is started in accordance with the print schedule, the print job within the reserved print job display area 510 is transferred to the processing print job display area 520. In the completed print job display area 530, a print job which has been completed (including a print job which is terminated due to an error by one of the intermediate data generating module 150, the image generating module 155, and the print module 160) is displayed.

The reserved print job display area 510 has an ID field 511, a job name field 512, an information field 513, a size field 514, a received date field 515, and a reserved date field 516. In the ID field 511, the ID of a print job is displayed. In the job name field 512, the job name of this print job is displayed. In the information field 513, information concerning this print job, such as the name of a document to be printed, is displayed. In the size field 514, the size of the document to be printed in this print job is displayed. In the received date field 515, the time and date at which this print job is received (year, month, day, hour, minute, second, millisecond, or a combination thereof) is displayed. In the reserved date field 516, the time and date at which the print job is reserved is displayed.

The processing print job display area 520 has an ID field 521, a job name field 522, an information field 523, a state field 524, a raster image processor (RIP) processing field 525, a RIP remaining time field 526, and a print field 527. In the ID field 521, the ID of a print job is displayed. In the job name field 522, the job name of this print job is displayed. In the information field 523, information concerning this print job is displayed. In the state field 524, the processing state of this print job is displayed. In the RIP processing field 525, the state of RIP processing (image generating processing) in this print job is displayed. In the RIP remaining time field 526, the remaining time for RIP processing in this print job is displayed. In the print field 527, the state of printing in in this print job is displayed.

The completed print job display area 530 has an error/completion field 531, an ID field 532, a job name field 533, an information field 534, an error information field 535, a size field 536, and a received date field 537. In the ID field 532, the ID of a print job is displayed. In the job name field 533, the job name of this print job is displayed. In the information field 534, information concerning this print job is displayed. In the error information field 535, error information concerning this print job is displayed. In the size field 536, the size of a document to be printed in this print job is displayed. In the received date field 537, the time and date at which this print job is received is displayed.

Figure 6:
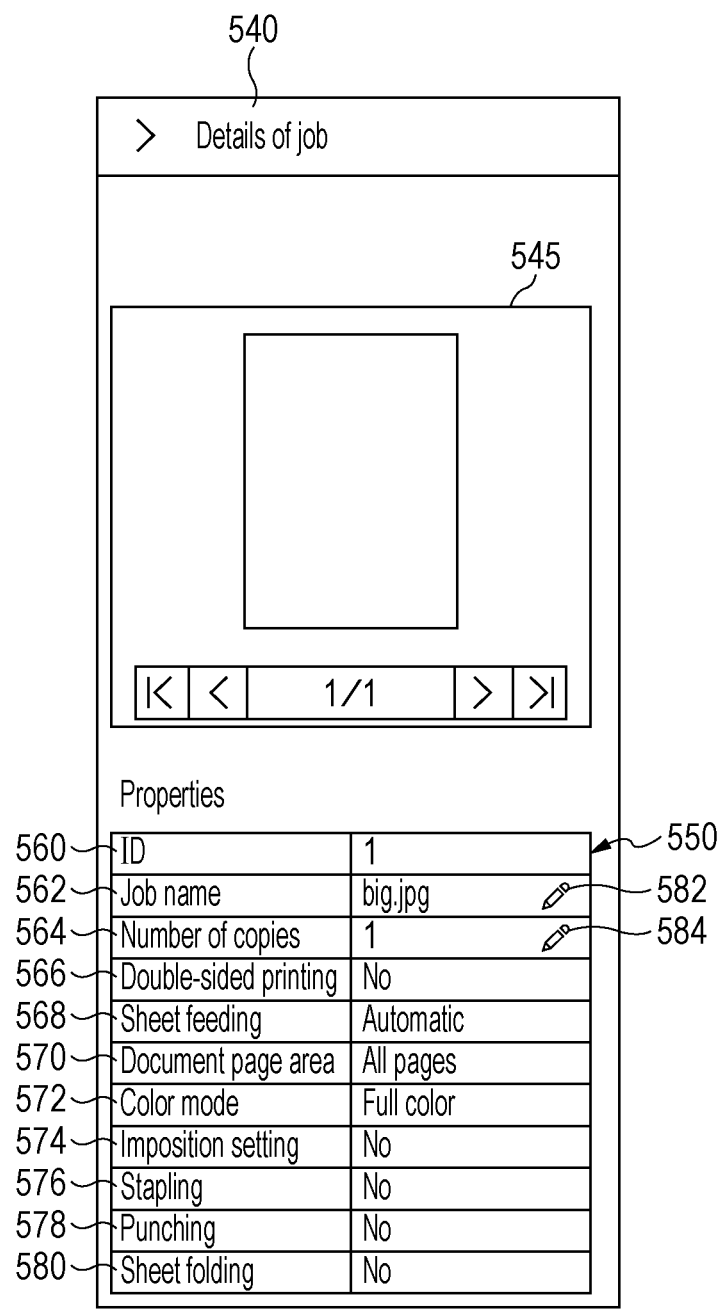
FIG. 6 illustrates a display example in the exemplary embodiment.

The print job attribute display area 540 will be discussed with reference to FIG. 6. In the print job attribute display area 540, the attributes of a print job selected by an operator in one of the reserved print job display area 510, the processing print job display area 520, and the completed print job display area 530 are displayed. The example in FIG. 6 shows the print job attribute display area 540 when the print job on the first row within the reserved print job display area 510 has been selected by the operator.

The print job attribute display area 540 includes a thumbnail image display area 545 and an attribute display area 550.

In the thumbnail image display area 545, a thumbnail image (reduced-size image) of a document to be printed in the selected print job is displayed. A thumbnail image may be generated as a result of the image generating module 155 performing image generating processing. In this case, however, if another operator has already made a request to change an attribute of this print job, the image generating module 155 is unable to perform image generating processing, and thus, a thumbnail image is not displayed. When a thumbnail image is generated for the first time, it may be stored, and this thumbnail image may be displayed from the second time. If an attribute of this print job is changed after a thumbnail image is stored (that is, after a thumbnail image is generated), a thumbnail image may be generated again as a result of the image generating module 155 performing image generating processing after the limitations (for example, the other operators are unable to perform image generating processing) are canceled.

The attribute display area 550 has two columns, that is, an attribute name column (left column) and an attribute value column (right column), as a pair. The attribute display area 550 has an ID field 560, a job name field 562, a number-of-copies field 564, a double-sided printing field 566, a sheet feeding field 568, a document page area field 570, a color mode field 572, an imposition setting field 574, a stapling field 576, a punching field 578, a sheet folding field 580. These fields are generated by visualizing the print job attribute table 400. In the print job ID field 560, the ID of the print job is displayed. In the job name field 562, the job name of this print job is displayed. In the number-of-copies field 564, the number of copies to be printed in the print job is displayed. In the double-sided printing field 566, information indicating whether double-sided printing is performed is displayed. In the sheet feeding field 568, information indicating how to feed a sheet in this print job is displayed. In the document page area field 570, the document page area of this print job is displayed. In the color mode field 572, a color mode of this print job is displayed. In the imposition setting field 574, an imposition setting of this print job is displayed. In the stapling field 576, information indicating whether stapling is performed in this print job is displayed. In the punching field 578, information indicating whether punching is performed in this print job is displayed. In the sheet folding field 580, information indicating whether sheet folding is performed in this print job is displayed.

A lock state icon 582 is displayed for the job name field 562, and a lock state icon 584 is displayed for the number-of-copies field 564. The lock state icons 582 and 584 indicate that this user is allowed to change the attribute value in the job name field 562 and that in the number-of-copies field 564. This user is not allowed to change the attribute values in the other fields. In some fields, the attribute values are not changeable (ID field 560, for example). In some fields, another user is changing the attribute value under mutual exclusion control and this user is not allowed to change the attribute value in such a field (color mode field 572, for example). Determining as to whether a lock state icon will be displayed for a certain field may be made by referring to the change flag field for the attribute of this field within the print job attribute table 400. More specifically, if the change flag in a change flag field for the attribute of a certain field indicates that the attribute has not been changed, a lock state icon is displayed for this field. If the change flag in a change flag field indicates that the attribute has been changed, a lock state icon is not displayed for this field.

Figure 7:
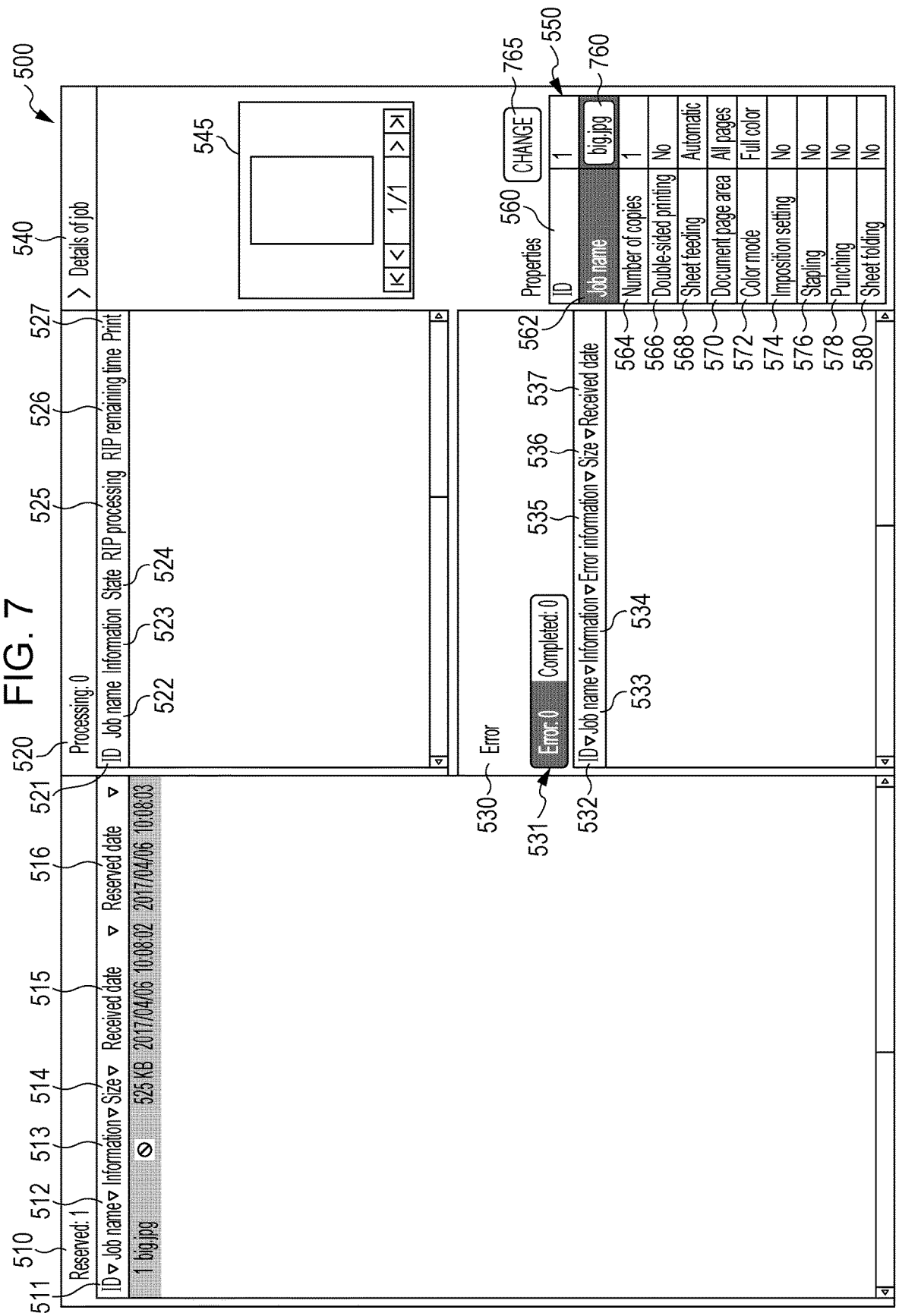
FIG. 7 illustrates a display example in the exemplary embodiment.

FIG. 7 illustrates a display example in the exemplary embodiment. More specifically, FIG. 7 illustrates a display example in which a change button 765 is selected by the user from the state shown in FIG. 5 or 6. Selecting of the change button 765 is an example of making a request to change an attribute. Alternatively, clicking of the lock state icon 582, a double-clicking (or may be single-clicking) of the attribute value in the job name field 562, or shifting of a pointer to this attribute value may be regarded as making a request to change the attribute. In the case of shifting of a pointer to an attribute value, the condition that the pointer stays on the attribute value for a predetermined time or longer may be set.

Figure 8:
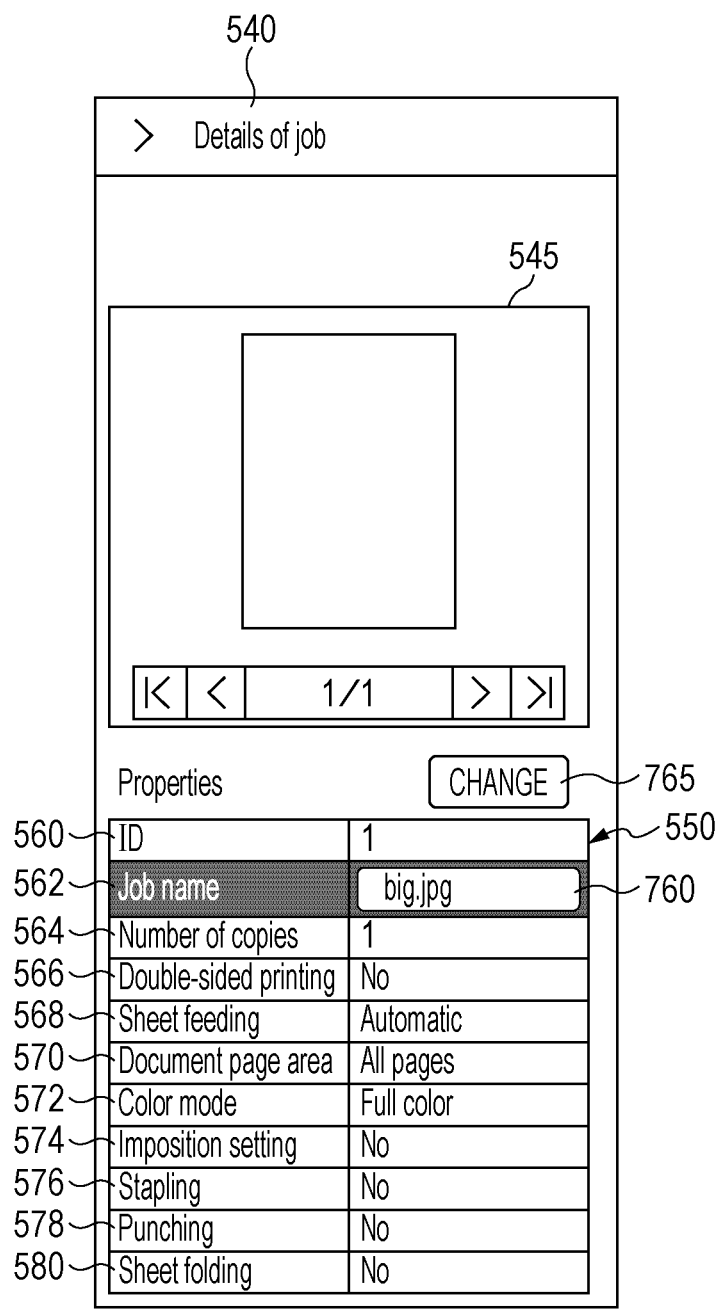
FIG. 8 illustrates a display example in the exemplary embodiment.

The print job attribute display area 540 will be discussed with reference to FIG. 8. In the print job attribute display area 540 shown in FIG. 8, the thumbnail image display area 545, the attribute display area 550, and the change button 765 are displayed.

When a request to change the attribute in the job name field 562 is received, the lock state icon 582 within the job name field 562 disappears. The color of the background within the job name field 562 is changed, for example, from white to blue, and the attribute value column of the job name field 560 is changed to an attribute changing field 760 indicating that the user can change the attribute value. Then, the user changes the name of the print job.

The lock state icon 584 within the number-of-copies field 564 has also disappeared. This is because the user can change only one attribute for one request to change an attribute, and thus, another attribute is not changeable while the job name within the job name field 562 is being changed.

Then, when the user selects an area other than the job name field 562, the job name changed by the user is set. That is, the job name is changed to the character string described within the attribute changing field 760. Selecting of a return key within the attribute changing field 760 may be assumed as the completion of the changing operation.

Details of the processing will be described below with reference to the flowcharts of FIGS. 9 and 10.

Figure 9:
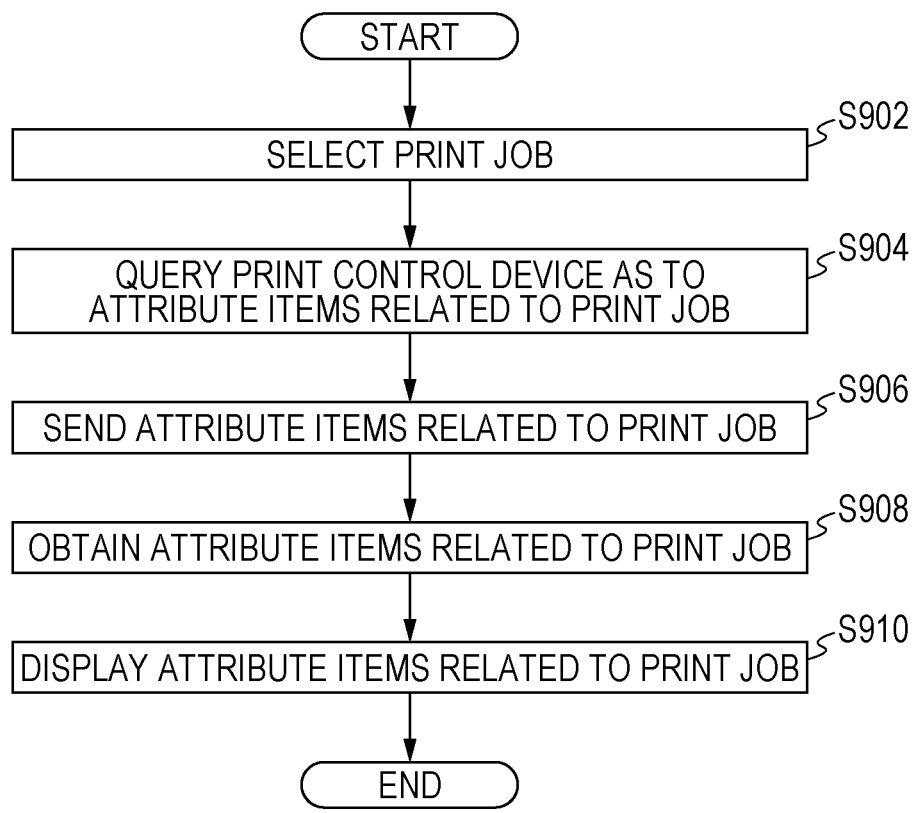
FIG. 9 is a flowchart illustrating an example of processing executed in the exemplary embodiment.

FIG. 9 is a flowchart illustrating an example of processing executed in the exemplary embodiment. The processing shown in FIG. 9 is processing executed in the display state shown in FIGS. 5 and 6, for example.

In step S902, a user selects a print job by using the user terminal 210. For example, the user selects the print job on the first row within the reserved print job display area 510 on the print status screen 500.

In step S904, the user terminal 210 queries the print control device 100 as to attribute items related to the print job. In the above-described example, the user terminal 210 sends a request to view the attributes of the print job of the print job ID: 1 to the print control device 100.

In step S906, the print control device 100 sends the attribute items related to the print job. In the above-described example, the print control device 100 sends the attributes of the print job of the print job ID: 1 to the user terminal 210.

In step S908, the user terminal 210 obtains the attribute items related to the print job.

In step S910, the user terminal 210 displays the attribute items related to the print job, as in the display example shown in FIGS. 5 and 6.

Step S902 is an operation executed by the user.

Steps S904, S908, and S910 are operations executed by the user terminal 210.

Step S906 is an operation executed by the print control device 100.

Unlike the processing shown in FIG. 11, in the processing shown in FIG. 9, the print control device 100 does not perform mutual exclusion control because it has only received a request to view the attributes of a print job, but it has not received a request to change an attribute of this print job.

Figure 10:
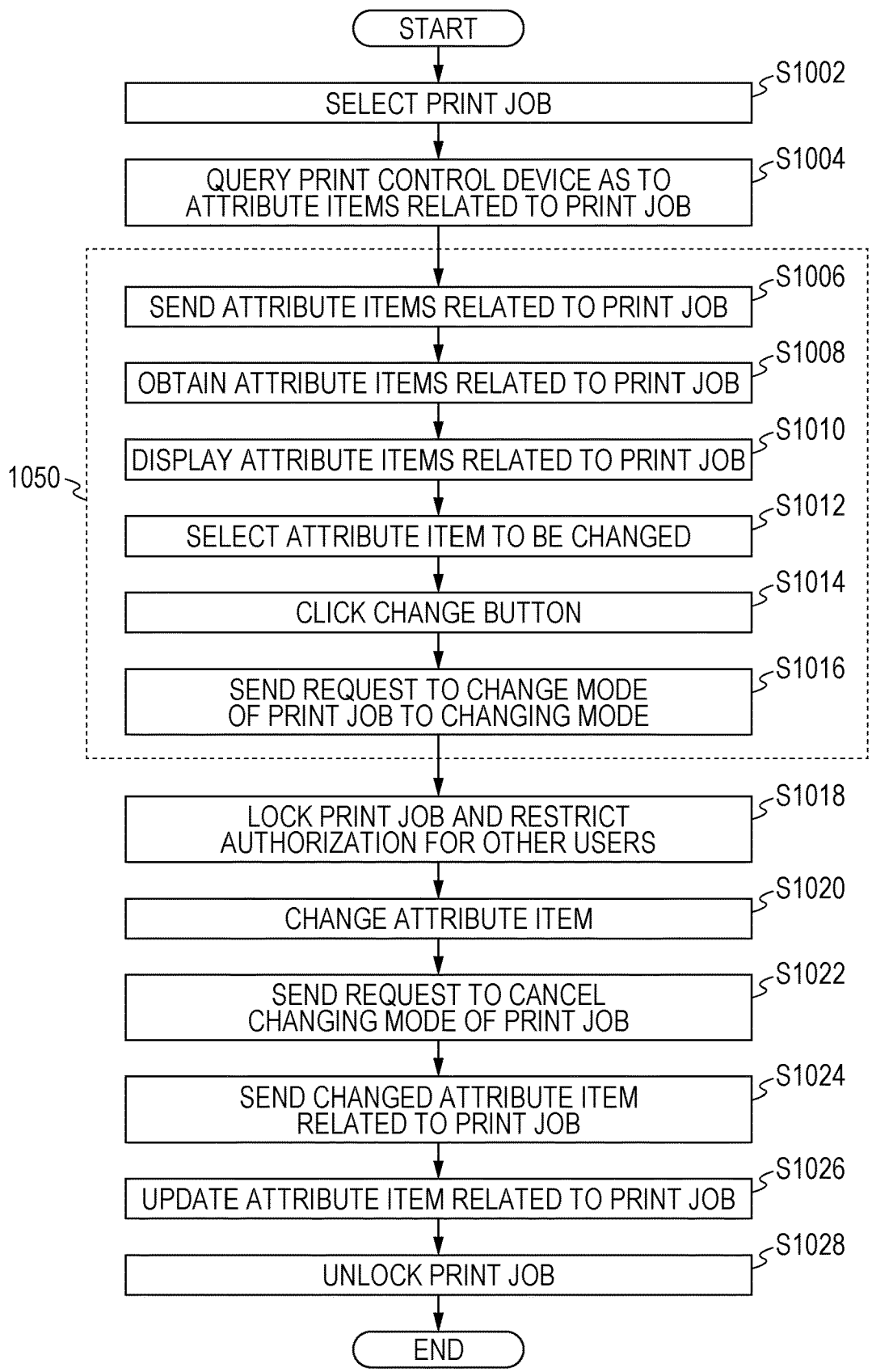
FIG. 10 is a flowchart illustrating an example of processing executed in the exemplary embodiment.

FIG. 10 is a flowchart illustrating an example of processing executed in the exemplary embodiment. The processing shown in FIG. 10 is an example of processing executed when the display state shifts from that shown in FIG. 5 (or FIG. 6) to that in FIG. 7 (or FIG. 8).

In step S1002, a user selects a print job by using the user terminal 210. For example, the user selects the print job on the first row within the reserved print job display area 510 on the print status screen 500.

In step S1004, the user terminal 210 queries the print control device 100 as to attribute items related to the print job. In the above-described example, the user terminal 210 sends a request to view the attributes of the print job of the print job ID: 1 to the print control device 100.

In step S1006, the print control device 100 sends the attribute items related to the print job. In the above-described example, the print control device 100 sends the attributes of the print job of the print job ID: 1 to the user terminal 210.

In step S1008, the user terminal 210 obtains the attribute items related to the print job.

In step S1010, the user terminal 210 displays the attribute items related to the print job, as in the display example shown in FIGS. 5 and 6.

In step S1012, the user selects an attribute to be changed by using the user terminal 210.

In step S1014, the user clicks the change button 765 (or the lock state icon 582) by using the user terminal 210. The user terminal 210 then sends a request to change the selected attribute to the print control device 100.

In step S1016, the user terminal 210 requests the print control device 100 to change the mode of the print job to the changing mode. The print control device 100 then receives this request.

In step S1018, the print control device 100 locks the print job and restricts authorization concerning this print job for other users. More specifically, the print control device 100 changes the flag in the change flag field for the attribute to be changed (the change flag field 422 for the job name) in the print job attribute table 400 to information indicating that the attribute has been changed ("1", for example). The print control device 100 may alternatively change the flags in the change flag fields for all the attributes of this print job to information indicating that the attributes have been changed.

In step S1020, the user changes the attribute selected in step S1012 by using the user terminal 210.

In step S1022, the user terminal 210 sends a request to cancel the changing mode set in the print job to the print control device 100.

In step S1024, the user terminal 210 sends the item of the changed attribute to the print control device 100.

In step S1026, the print control device 100 updates the attribute in this item.

In step S1028, the print control device 100 unlocks the print job. More specifically, the print control device 100 changes the flag in the change flag field for the changed attribute (the change flag field 422 for the job name) in the print job attribute table 400 to information indicating that the changing of this attribute has been completed (the attribute has not been changed) ("0", for example). If the print control device 100 has changed the flags in the change flag fields for all the attributes of this print job to information indicating that the attributes have been changed in step S1018, it returns the flags to information indicating that the attributes have not been changed.

Steps S1002, S1012, S1014, and S1020 are operations executed by a user.

Steps S1004, S1008, S1010, S1016, S1022, and S1024 are operations executed by the user terminal 210.

Steps S1006, S1018, S1026, and S1028 are operations executed by the print control device 100.

A processing period 1050 (steps S1006 through S1016) is a period from when the print control device 100 sends the attribute items related to the print job until when the user terminal 210 requests the print control device 100 to change the mode of the print job to the changing mode. The processing period 1050 is a long period because some users may have to search for an attribute to be edited, for example.

However, unlike the example shown in FIG. 11, a period for which mutual exclusion control is performed (steps S1018 through S1028) is not included in the processing period 1050. Accordingly, the period for which mutual exclusion control is performed is not influenced by the processing period 1050 and thus becomes shorter than that in the example in FIG. 11. That is, the period for which other users are unable to change the attributes becomes shorter than that in FIG. 11.

Figure 12:
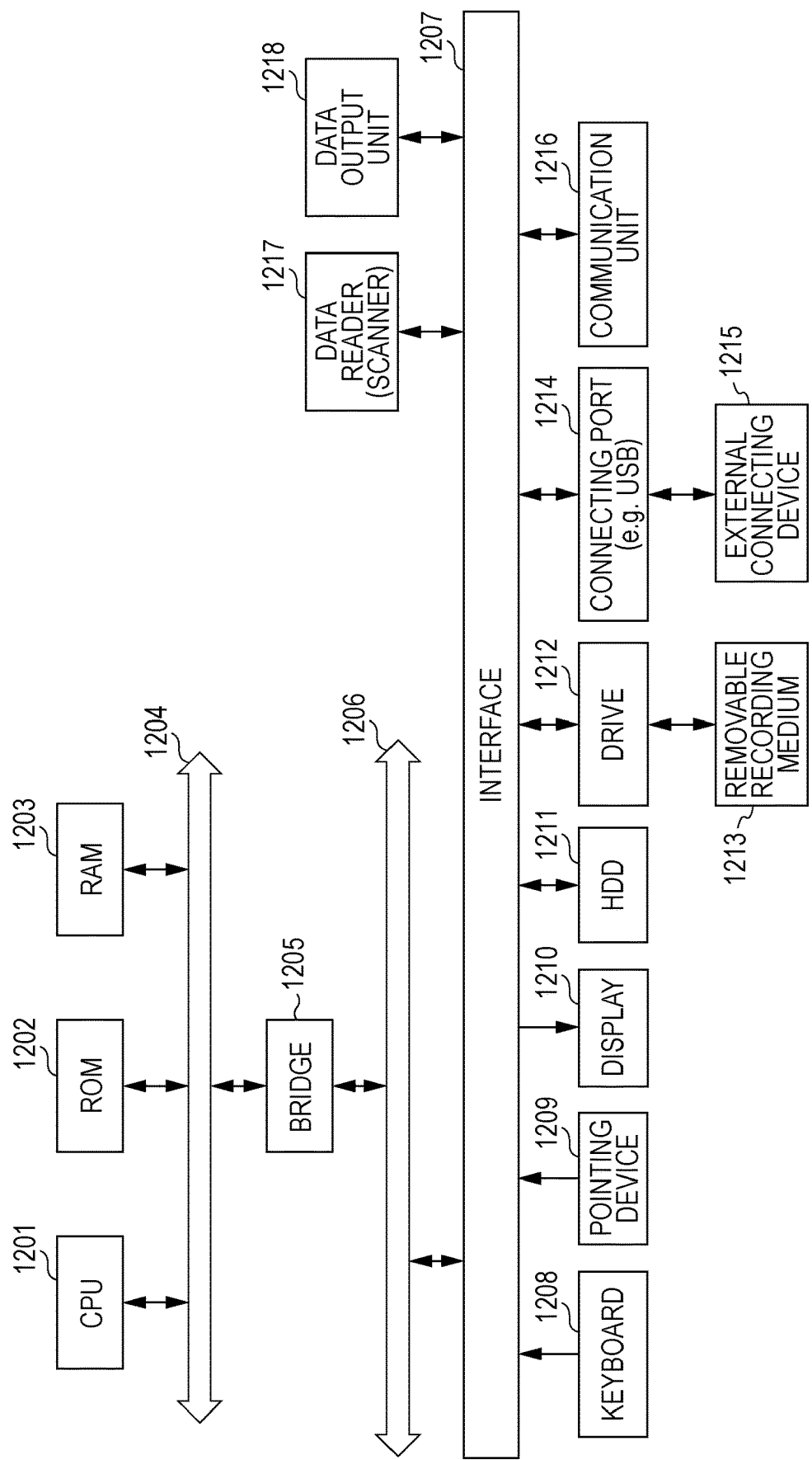
FIG. 12 is a block diagram illustrating an example of the hardware configuration of a computer implementing the exemplary embodiment.

An example of the hardware configuration of an information processing apparatus of this exemplary embodiment will be described below with reference to FIG. 12. The hardware configuration shown in FIG. 12 is implemented as a personal computer (PC), for example, and includes a data reader 1217, such as a scanner, and a data output unit 1218, such as a printer.

A CPU 1201 is a control unit that executes processing in accordance with a computer program describing an execution sequence of the modules of the above-described exemplary embodiment, that is, the receiving module 105, the sending module 110, the information processing module 115, the print job attribute extracting module 120, the print job attribute changing module 125, the limiter module 130, the control module 135, the image processing control module 140, the intermediate data generating module 150, the image generating module 155, and the print module 160.

A read only memory (ROM) 1202 stores programs and operation parameters used by the CPU 1201. A RAM 1203 stores programs used during the execution of the CPU 1201 and parameters which change appropriately during the execution of the programs. The CPU 1201, the ROM 1202, and the RAM 1203 are connected to one another via a host bus 1204, which is constituted by, for example, a CPU bus.

The host bus 1204 is connected to an external bus 1206, such as a peripheral component interconnect/interface (PCI) bus, via a bridge 1205.

A keyboard 1208 and a pointing device 1209, such as a mouse, are devices operated by an operator. A display 1210 is, for example, a liquid crystal display or a cathode ray tube (CRT), and displays various items of information as text or image information. Alternatively, a touch screen having both of the functions of the pointing device 1209 and the display 1210 may be provided. In this case, to implement the function of the keyboard, unlike the keyboard 1208, the keyboard may not be a physical keyboard, and a keyboard drawn on a screen (touch screen) by using software, that is, a so-called software keyboard or screen keyboard, may be used.

A hard disk drive (HDD) 1211 has a built-in hard disk (may alternatively be a flash memory, for example) and drives the hard disk so as to record or play back information or programs executed by the CPU 1201. The hard disk implements the function of the print job storage module 145, for example. Print jobs, documents to be printed, intermediate mode document data generated by the intermediate data generating module 150, printing data generated by the image generating module 155, various other items of data, and various other computer programs are also stored in the hard disk.

A drive 1212 reads data or a program recorded in a removable recording medium 1213, such as a magnetic disk, an optical disc, a magneto-optical disk, or a semiconductor memory, and supplies the read data or program to the RAM 1203 via an interface 1207, the external bus 1206, the bridge 1205, and the host bus 1204. The removable recording medium 1213 is also usable as a data recording region.

A connecting port 1214 is a port for connecting the PC to an external connecting device 1215, and has a connecting portion, such as a universal serial bus (USB) port or an IEEE1394 port. The connecting port 1214 is connected to, for example, the CPU 1201, via the interface 1207, the external bus 1206, the bridge 1205, and the host bus 1204. A communication unit 1216 is connected to a communication line and executes data communication processing with an external source. The data reader 1217 is, for example, a scanner, and executes processing for reading documents. The data output unit 1218 is, for example, the printer 250, and executes processing for outputting document data.

The hardware configuration of the information processing apparatus shown in FIG. 12 is only an example, and the information processing apparatus may be configured in any manner in which the modules described in the exemplary embodiment are executable. For example, some modules may be configured as dedicated hardware (for example, an application specific integrated circuit (ASIC)), or some modules may be installed in an external system and be connected to the information processing apparatus via a communication line. Alternatively, a system, such as that shown in FIG. 12, may be connected to a system, such as that shown in FIG. 12, via a communication line, and may be operated in cooperation with each other. Additionally, instead of into a PC, the modules may be integrated into a copying machine, a fax machine, a scanner, a printer, or a multifunction device (image processing device having two or more functions as a scanner, a printer, a copying machine, and a fax machine).

The above-described program may be stored in a recording medium and be provided. The program recorded on a recording medium may be provided via a communication medium. In this case, the above-described program may be implemented as "a non-transitory computer readable medium storing the program" in the exemplary embodiment of the invention.

"A non-transitory computer readable medium storing a program" is a recording medium storing a program that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW, such as DVD+R and DVD+RW, compact discs (CDs), and more specifically, a read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, and a secure digital (SD) memory card.

The entirety or part of the above-described program may be recorded on such a recording medium and stored or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. Further, the program may be recorded in any form, for example, it may be compressed or encrypted in a manner such that it can be reconstructed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a receiver that receives a viewing request to view an attribute of a print job from an operator, the print job being a job which allows a plurality of operators to make a request to view the attribute;
    a sender that sends the attribute of the print job in accordance with the viewing request; and
    a limiter that imposes limitations, when a changing request to change the attribute of the print job is received from the operator, so that operators other than the operator having made the changing request will be unable at least to change the attribute of the print job and to generate an image concerning the print job.

2. The information processing apparatus according to claim 1, further comprising:
    a controller that performs control so that, when the viewing request is received, a limitation concerning viewing of the attribute of the print job will not be imposed.

3. The information processing apparatus according to claim 2, wherein the controller performs control so that, when the viewing request has been received, the operators other than the operator having made the viewing request will still be able to change the attribute of the print job and to generate an image concerning the print job.

4. The information processing apparatus according to claim 1, wherein, when detecting that an operation for changing the attribute to be changed has been completed, the limiter cancels the limitations.

5. The information processing apparatus according to claim 4, wherein, when detecting that an area other than an area of the attribute to be changed is selected, the limiter assumes that the operation for changing the attribute has been completed.

6. The information processing apparatus according to claim 4, wherein, when detecting that an input completion code has been input within an area of the attribute to be changed by using a keyboard, the limiter assumes that the operation for changing the attribute has been completed.

7. A non-transitory computer readable medium storing a program causing a computer to execute a process, the process comprising:
    receiving a viewing request to view an attribute of a print job from an operator, the print job being a job which allows a plurality of operators to make a request to view the attribute;
    sending the attribute of the print job in accordance with the viewing request; and
    imposing limitations, when a changing request to change the attribute of the print job is received from the operator, so that operators other than the operator having made the changing request will be unable at least to change the attribute of the print job and to generate an image concerning the print job.

* * * * *